US006987765B2

(12) United States Patent
March et al.

(10) Patent No.: US 6,987,765 B2
(45) Date of Patent: Jan. 17, 2006

(54) CHANGING MEDIA SESSIONS

(75) Inventors: Sean W. March, Plano, TX (US); Patrick N. Sollee, Richardson, TX (US); David W. McKnight, Garland, TX (US)

(73) Assignee: Nortel Networks Limited, St. Laurent (CA)

( * ) Notice: Subject to any disclaimer, the term of this patent is extended or adjusted under 35 U.S.C. 154(b) by 864 days.

(21) Appl. No.: 09/881,603

(22) Filed: Jun. 14, 2001

(65) Prior Publication Data

US 2003/0007497 A1 Jan. 9, 2003

(51) Int. Cl.
*H04L 12/28* (2006.01)

(52) U.S. Cl. ...................................... 370/392; 370/410

(58) Field of Classification Search ................ 370/384, 370/395.2, 410, 522, 235, 236, 392, 465
See application file for complete search history.

(56) References Cited

U.S. PATENT DOCUMENTS

| | | | | |
|---|---|---|---|---|
| 5,809,018 A * | 9/1998 | Lehmusto | ................... | 370/330 |
| 5,933,412 A * | 8/1999 | Choudhury et al. | ........ | 370/218 |
| 5,941,988 A | 8/1999 | Bhagwat et al. | | |
| 6,128,298 A | 10/2000 | Wootton et al. | ............ | 370/392 |
| 6,731,642 B1 * | 5/2004 | Borella et al. | .............. | 370/401 |
| 2001/0015981 A1 * | 8/2001 | Nelson et al. | .............. | 370/410 |

FOREIGN PATENT DOCUMENTS

EP 1 235 406 A1 8/2002

OTHER PUBLICATIONS

R. Sparks et al., *SIP Telephony Services Examples With Call Flows*, IETF Internet Draft, Oct. 1999, pgs. 1-84.

Information Science Institute , *Internet Protocol, Darpa Internet Program Protocol Specification*, RFC 791, pp. 1-44 (Sep. 1981).

J. Postel, *User Datagram Protocol, RFC*, 768, pp. 1-3 (Aug. 1980).

S. Deering, Network Working Group Request For Comments: 2460, *Internet Protocol, Version 6 (IPv6) Specification*, pp. 1-33 (Dec. 1998).

H. Shulzrinne, Network Working Group Request for Comments: 1889, *RTP: A Transport Protocol For Real-Time Applications*, PP. 1-63 (Jan. 1996).

M. Handley, Network Working Group Request For Comments: 2543, *SIP: Session Initiation Protocol*, pp. 1-128 (Mar. 1999).

M. Arango, Network Working Group Request For Comments: 2705, *Media Gateway Control Protocol* (MGCP), pp. 1-113 (Oct. 1999).

* cited by examiner

*Primary Examiner*—Andy Lee
(74) *Attorney, Agent, or Firm*—Trop Pruner & Hu, PC

(57) ABSTRACT

A method and apparatus comprises a controller to establish a call session between a first endpoint and a second endpoint. Without exchanging call setup signaling with the first endpoint, the controller is able to pivot the call session from the second endpoint to another endpoint so that media communication can occur between the first and other endpoints. The first endpoint remains "anchored" in the call session. The pivot is accomplished by sending a call request to the other endpoint and exchanging messages with a media portal that controls the communication of packets between endpoints. The media portal contains a network address and translation module that performs translation of addresses and/or ports of media packets communicated from one endpoint to another.

27 Claims, 7 Drawing Sheets

CHANGING MEDIA SESSIONS

TECHNICAL FIELD

The invention relates generally to changing media sessions after call setup.

BACKGROUND

Various forms of communications can be performed in packet-based networks, such as electronic mail, web browsing, file transfer, and so forth. With the increased capacity and reliability of packet-based networks, voice communications (along with other forms of real-time, interactive communications) have also become feasible. In such communications, voice and other real-time data are carried in packets that are sent across the network.

Various standards have been proposed for voice and multimedia communications over packet-based networks. One such standard is the H.323 Recommendation from the International Telecommunication Union (ITU). Another standard for voice and multimedia communications is the Session Initiation Protocol (SIP), as developed by the Internet Engineering Task Force (IETF). Generally, H.323, SIP, and other control protocols are used for negotiating session information to coordinate the establishment of a call session. Once negotiation setup has been completed, packetized media (including voice or other forms of real-time data) can flow between endpoints. A media transport protocol, such as the Real-Time Protocol (RTP), is used for conveying packetized media between the endpoints.

In some cases, it may be desirable to redirect a call from an originating terminal from one destination terminal to another destination terminal. For example, in some networks, an announcement server may first process an incoming call, with the announcement server playing a pre-recorded message and providing various options for selection by a user. The call is then redirected to another terminal or node. Conventionally, to redirect a call, control signaling is exchanged with the originating terminal so that the appropriate media path is established between the originating terminal and the destination terminal. In certain scenarios, the re-negotiation of media paths in mid-call (or post-setup) is a complex process that is not supported by less capable devices. It also potentially adds an undesirable increase in network traffic and delay in redirecting the call.

SUMMARY

In general, in accordance with an embodiment, a method of providing a call session includes establishing a call session between a first endpoint and a second endpoint to enable communication of media between the first and second endpoints. The second endpoint is pivoted to a third endpoint in the call session without exchanging call setup signaling with the first endpoint to enable media communication between the first and third endpoints.

Alternatively, the call between the first endpoint and second endpoint can be pivoted such that the first endpoint is replaced by the third endpoint.

Some embodiments of the invention may have one or more of the following advantages. Both endpoints do not have to be involved in exchanges of call setup messages every time a media session is moved around (or redirected) between different endpoints. A further possible benefit is that the change in one of the media session endpoints can be accomplished transparently to an "anchored endpoint" (the endpoint that remains in the call session). In some embodiments, this enables the manipulation of a media stream to provide a relatively complex service transparently to the anchored endpoint.

Other or alternative features or advantages will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
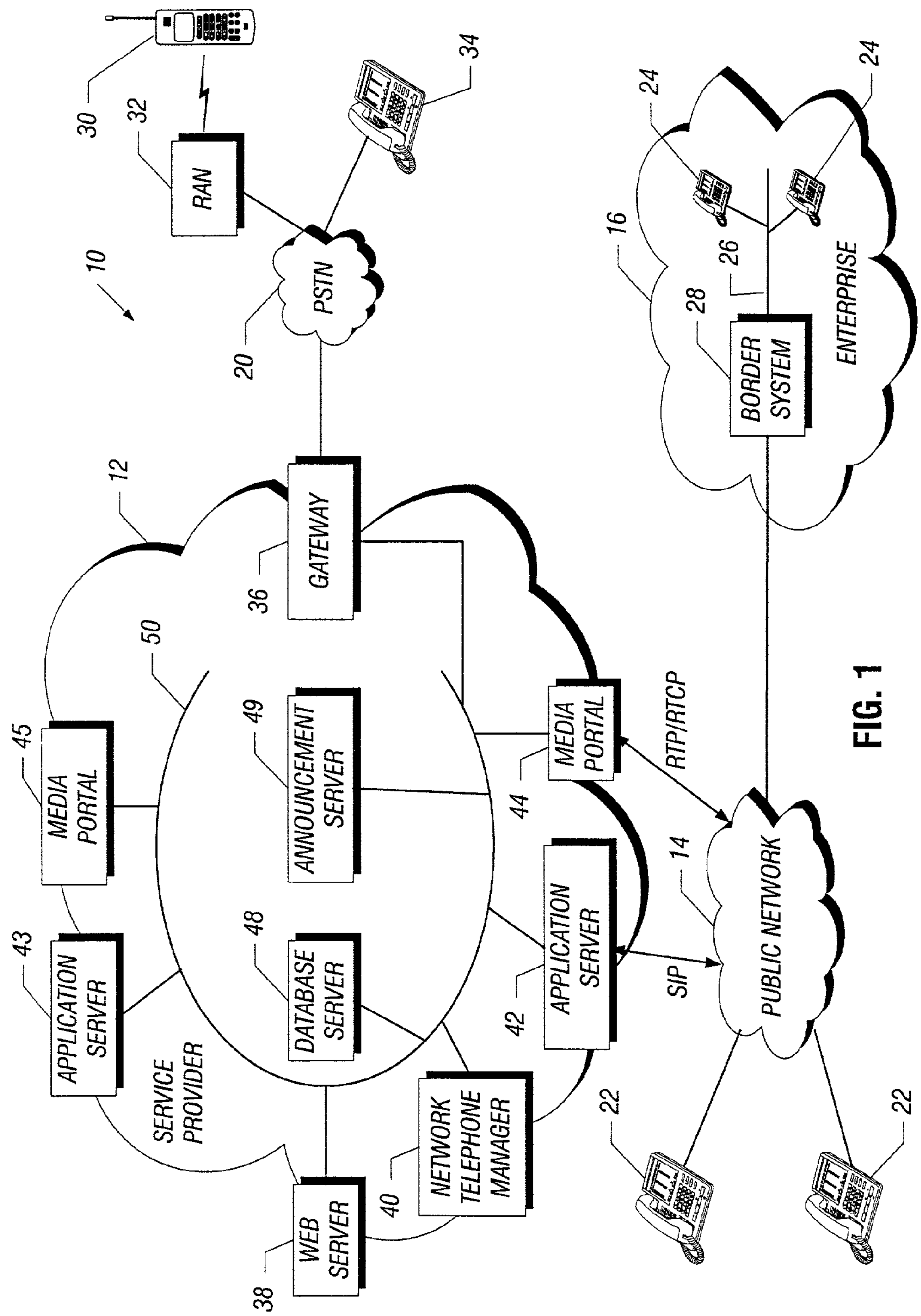
FIG. 1 is a block diagram of an example communications system that incorporates an embodiment of the invention.

Referring to FIG. 1, a communications system 10 includes a public network (e.g., the Internet) 14, an enterprise 16 (e.g., a company, a government agency, a university, or other organization of multiple users), a service provider 12, and a public switched telephone network (PSTN) 20. The arrangement of FIG. 1 is shown for purposes of illustration and example, since other embodiments can have other arrangements.

The service provider 12 includes a private network 50 coupled to various internal nodes, and the enterprise 16 includes a private network 26 coupled to various internal nodes and terminals. The service provider 12 enables access by subscribers of various resources in the communications system 10, including the public network 14 and the PSTN 20. Thus, a user station coupled to the public network 14, such as one of user stations 22 or one of user stations 24 in the enterprise 16, can perform various forms of communications through the service provider 12. Examples of possible communications include electronic mail, web browsing, and real-time, interactive communications (e.g., voice, video conferencing, and so forth).

The user stations 24, which are connected to the enterprise private network 26, communicate with the public network 14 through a border system 28. In one example, the border system 28 includes a firewall and network address and port translation capabilities.

The user stations 22 and 24 can be network telephones (which are telephones including a network interface to enable communication with a packet-based network), computers fitted with voice processing capabilities (referred to as "softphones"), or other terminals capable of participating in real-time, interactive communications sessions. One example of a network telephone is the i2004 telephone from Nortel Networks. One example of an application that is executable in a computer to enable voice capabilities is the i2050 product from Nortel. Examples of other user stations that can be endpoints of communications sessions include mobile stations 30 coupled by wireless links to a radio access network (RAN) 32, which is in turn connected to the PSTN 20. Also, a wired telephony device 34 can be coupled to the PSTN 20.

The service provider 12 includes various components that are visible on the public network 14, including a web server 38, a network telephone manager 40, application servers 42 and 43, and media portals 44 and 45. The service provider 12 includes internal nodes that are not visible to the public network 14, including a gateway 36 to the PSTN 20, a database server 48, an announcement server 49, and other nodes (not shown). The gateway 36 translates between call control signaling and media according to a first format (e.g., packet-based format) used on the public network 14 and another format (e.g., circuit-switched format) used on the PSTN 20. The database server 48 stores information of registered devices, including information relating to which domain the devices are in, subscriber information, subscribed services, and other information. The announcement server 49 can be used to play an announcement for certain incoming calls.

The web server 38 presents web pages that can be browsed by users on the public network 14. The network telephone manager 40 is used for managing network telephones. The network telephone manager 40 generates and receives call control signaling on behalf of the network telephones. Once a call is established, media is communicated directly with a respective network telephone. In other embodiments, the network telephones may be capable of exchanging and processing call control signaling without the assistance of the network telephone manager 40.

The application server 42 or 43 communicates call control signaling with stations or nodes on the public network 14 or on the private network 50 for establishing a call. Once the call is established, media or bearer traffic is communicated through the media portal 44 or 45 between endpoints. In one embodiment, the media packets can contain Real-Time Protocol (RTP) data that are carried within a User Datagram Protocol (UDP)/Internet Protocol (IP) packet.

In accordance with some embodiments of the invention, after a call session has been established between two terminals, the application server 42 or 43 is able to change the call session by switching one of the terminals to an alternate terminal without exchanging call setup signaling with the terminal that remains in the call session (the "anchored terminal"). This feature is referred to as the "anchor/pivot" feature, which allows an endpoint to "pivot" from one terminal or node to another terminal or node while the anchored terminal or node remains in the call session. A benefit offered by this feature is that both endpoints do not have to be involved in exchanges of call setup messages every time a media or call session is moved around. A further benefit is that the change in one of the media session endpoints can be accomplished transparently to the anchored endpoint. Thus, for example, if the application server 42 needs to manipulate the media stream to provide a complex service, it can do so transparently to the anchored endpoint (which can be a caller). The anchor/pivot feature is described further below.

In one example, call control signaling for establishing a call session is according to a Session Initiation Protocol (SIP). SIP is part of the multimedia data and control architecture from the IETF, and one version of SIP is described in Request for Comments (RFC) 2543, entitled "SIP: Session Initiation Protocol," dated 1999. SIP can be used to initiate call sessions as well as to invite members to a session that may have been advertised by some other mechanism, such as electronic mail, web pages, and so forth. RTP, which defines a protocol for transporting real-time data, is described in RFC 1889 entitled "RTP: A Transport Protocol for Real-Time Applications," dated January 1996. UDP defines a transport layer that is described in RFC 768, entitled "User Datagram Protocol," dated August 1980. One version of IP is described in RFC 791, entitled "Internet Protocol," dated September 1981, while another version of IP is described in RFC 2460, entitled "Internet Protocol, Version 6 (IPv6) Specification," dated December 1998. Other standards can also be employed to provide call control signaling, such as the H.323 Recommendation from the International Telecommunication Union (ITU).

As used here, a "call session" refers generally to a real-time, interactive communications session that involves the exchange of real-time data between multiple parties. An interactive communications session refers to a session in which two or more parties are involved in an exchange of data. A real-time, interactive communication session refers to an exchange of data, such as audio and/or video data, on a substantially real-time basis between two endpoints. A session is substantially real-time if interaction is occurring between two endpoints with communication from one endpoint followed relatively quickly by a response or another communication from the other endpoint. A "call request" is a message for establishing a call session. A "media packet" or "media data unit" refers to a packet or data unit carrying bearer traffic (e.g., voice, video, etc.) in a call session. "Media communication" refers to communication of media packets or other data units in a communications session (e.g., a call session).

A feature of the media portal 44 or 45 is its ability to hide or shield identities of endpoints from each other during a call session. From the perspective of each endpoint, the media portal 44 or 45 is the node that the endpoint is communicating with. In effect, the media portal 44 or 45 masquerades as each of the endpoints in a call session between the endpoints. Thus, a call between endpoints 1 and 2 no longer flows from 1 to 2, but rather flows between 1 and 2' (which is the network presence of endpoint 2 on the media portal 44 or 45) and between 1' (which is network presence of endpoint 1 on the media portal 44 or 45) and 2. In a call session between endpoints 1 and 2, endpoint 1 sends media packets to 2' (thinking that it is 2), and endpoint 2 sends media packets to 1' (thinking that it is 1).

To enable this feature, the media portal 44 or 45 includes a network address and port translation (NAPT) module that translates both the source and destination addresses (e.g., IP addresses) and ports (e.g., UDP ports) of each received packet. Although reference is made to an NAPT module that translates both network addresses and ports, other embodiments may involve translation modules that translate only the network address or only the port. Calls handled through the service provider 12 can involve endpoints that are both located outside the private network 50, such as user stations 22 and/or user stations 24. Alternatively, a call can involve an endpoint outside the service provider private network 50 and a node on the service provider private network 50, such as the gateway 36 or the announcement server 49.

Figure 2:
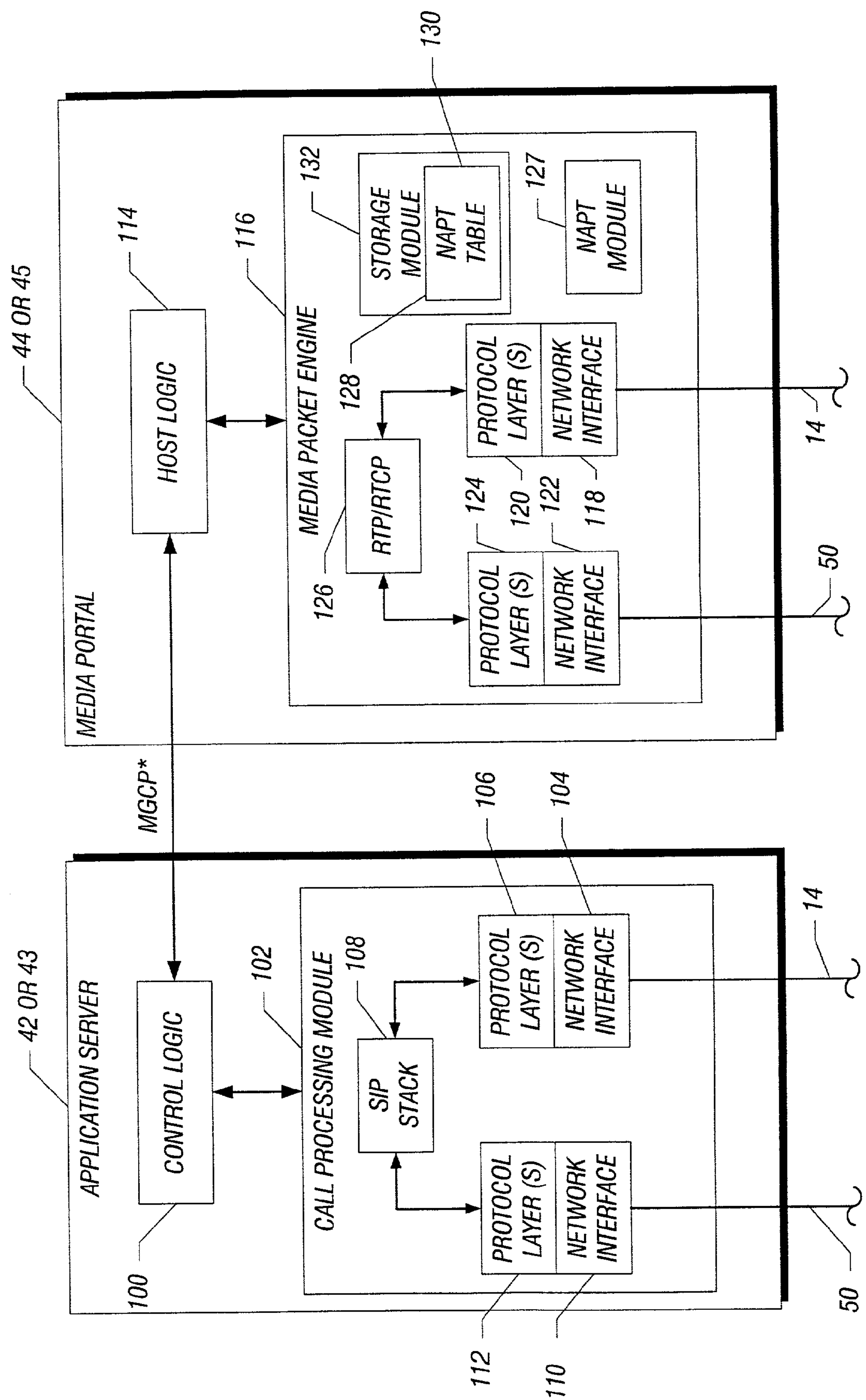
FIG. 2 is a block diagram of components of an application server and a media portal, in accordance with an embodiment.

Referring to FIG. 2, components of the application server 42 or 43 and the media portal 44 or 45 are illustrated. The application server 42 or 43 includes control logic 100 and a call processing module 102. The call processing module 102 receives call control signaling from the public network 14 and the private network 50. The call processing module 102 includes a network interface 104 to the public network 14, one or more protocol layers 106 above the network interface 104, and a SIP stack 108 for processing SIP messages. In one embodiment, the protocol layers 106 include a UDP transport layer and an IP network layer.

The call processing module 102 also includes a second network interface 110 coupled to the private network 50, and one or more protocol layers 112 above the network interface 110.

The control logic 100 of the application server 42 or 43 communicates with host logic 114 in the media portal 44. The control logic 100 and host logic 114, which can be implemented in software or a combination of software and hardware, employ a predefined messaging scheme to exchange messages with each other. In one example, the messaging scheme is according to an enhanced version of the Media Gateway Control Protocol (MGCP), as described in RFC 2705, entitled "Media Gateway Control Protocol (MGCP), Version 1.0," dated October 1999. Enhancements to the MGCP messages are added to support transport of certain types of data between the media portal 44 or 45 and the application server 42 or 43. The enhancements include the introduction of a new format for a parameter (EndpointId) used to identify endpoints and a parameter (referred to as X+NAPTAddressType) to specify the type of network mapping. Such enhancements are explained below.

The media portal 44 or 45 also includes a media packet engine 116. In one embodiment, the media packet engine 116 can be implemented on multiple circuit boards or blades (each with two interfaces to the public and private networks 14 and 50) to enhance concurrent communication of messages. The media packet engine 116 includes a first network interface 118 coupled to the public network 14, and one or more protocol layers 120 above the network interface 118. Similarly, a second network interface 122 is coupled to the private network 50, and one or more protocol layers 124 are provided above the network interface 122. An RTP/RTCP module 126 is also part of the media packet engine 116. RTP, which provides a mechanism for transporting real-time data across a packet-based network, is an application sublayer that typically runs on top of the UDP layer (which is part of the protocol layers 120 or 124). Specified along RTP is the Real-Time Control Protocol (RTCP), which provides a mechanism for sharing various session data between endpoints. In accordance with one embodiment, voice and other forms of real-time data are carried in RTP packets communicated across the public network 14 and the private network 50.

Also included in the media packet engine 116 is an NAPT module 127 and an NAPT table 128 that contains plural entries 130. Each entry of the NAPT table 128 contains mapping information for source and destination addresses and ports of media packets received from the networks 14 and 50. For a given call session involving a first device and a second device, each NAPT table entry includes a first address and port of the first device, a second address and port of the second device, a first alias address and port mapped to the first device address and port, and a second alias address and port mapped to the second device address and port. The contents of each NAPT table entry are discussed further below. The NAPT table entry is dynamically updated as a call session is being established and throughout the life of the call session. Once the call session is terminated, the allocated resources in the NAPT table entry are deleted and made available to other call sessions.

The NAPT table 128 is stored in a storage module 132. The NAPT module 127 uses information in the NAPT table 128 to perform network address and port translations. Before proceeding to a discussion of the anchor/pivot feature in accordance with some embodiments, a "normal" call flow (without the anchor/pivot feature) in accordance with some embodiments of the invention is first described. In an example call flow shown in FIG. 3, a call session is established between user station A and user station B. In the call flow, it is assumed that both users stations are in the same domain and serviced by the same application server (42) and media portal (44). User station A is the initiator of the call. User station A sends (at 300) a call request. If SIP messaging is used, the call request is a SIP INVITE message. The SIP INVITE message is sent to the application server 42. The INVITE message contains the following content (not all elements of the message have been shown):

INVITE
From: A@xxx.com
To: B@xxx.com
SDP: RTP/RTCP 47.1.1.1:1000

In the INVITE message, the From: address represents user station A, and the To: address represents user station B. A Session Description Protocol (SDP) portion contains the originator's network address and port that the destination node or station is to send media packets to once the call is established. By convention, this can also be used by the originator to send packets to the terminator. SDP is described in RFC 2327, entitled "SDP: Session Description Protocol," dated April 1998. In the example, the network address is 47.1.1.1, and the port number is 1000. The combination of the network address and port is represented as 47.1.1.1:1000. The flag RTP/RTCP indicates that the specified network address and port is the originating network address and port for media packets. More generally, the originating network address and port for user station A is referred to as $A_{media}$, the address and port of user station A for communicating media packets.

Once the application server 42 receives the INVITE message, it performs a location query on the To: address and determines that user station B is in the same domain (xxx.com) as user station A. B is then identified as a valid address. The location query can be performed using data in the database server 48. Next, the application server 42 sends a request (at 302) in real time to the media portal 44 to allocate NAPT resources for performing a network address and port translation of media packets in the requested call session. In one embodiment, the request includes an MGCP CreateConnection.

In response to the request, the media portal 44 allocates (at 304) the necessary resources (addresses and/or ports) to support NAPT for the call session. In one embodiment, the MGCP CreateConnection message format is as follows:

CRCX 1234 A:1000@47.1.1.1 MGCP 0.1
C: 987651
M: recvonly
MGCPVerb=CRCX (CreateConnection)
TransactionId=1234
EndpointId=A:1000@47.1.1.1
MGCPVersion=0.1
CallId=987651
ConnectionMode=recvonly (receive only)

One pertinent field of the CreateConnection message is the parameter EndpointId, which is equated to A:1000@47.1.1.1, where A represents audio. For video or other media, other indicators are used. The EndpointId parameter, which is a parameter whose format has been altered from the standard MGCP-defined EndpointId as an enhancement, identifies the address and port that the media portal 44 is to allocate resources for. The example provided above (and elsewhere in this description) is a relatively simple implementation of EndpointId. Other fuller implementations include providing a larger part of the media description that is in the SDP portion of the INVITE (or other SIP message). Also, a CallId parameter is supplied in the MGCP CreateConnection message. The CallId parameter is used as a key to point to an entry in the NAPT mapping table 128.

The media portal 44 reserves two external IP addresses and ports $A_{media}'$ and $B_{media}'$ (e.g., 201.3.3.3:1010 and 201.3.3.3:2020 for audio), one ($A_{media}'$) that is mapped to the originating endpoint address and port $A_{media}$, and one ($B_{media}'$) that is mapped to the terminating endpoint address and port $B_{media}$ (which is unknown to the media portal at this point). A mapping table entry containing the allocated addresses is shown below:

| CallId | OrigEndpoint ($A_{media}$) | OrigNAPTAddr ($A_{media}'$) | TermNAPTAddr ($B_{media}'$) | TermEndpoint ($B_{media}$) |
|---|---|---|---|---|
| 987651 | A:1000@47.1.1.1 | A:2020@201.3.3.3 | A:1010@201.3.3.3 | ??? |

In the above example, OrigEndpoint refers to the originating endpoint address and port $A_{media}$; OrigNAPTAddr refers to the originating NAPT address and port $A_{media}'$(at the public interface of the media portal) that the terminating endpoint (user station B) is communicating with; TermNAPTAddr refers to the terminating NAPT address and port $B_{media}'$ (also at the public interface of the media portal) that user station A communicates with; and TermEndpoint refers to the terminating endpoint address and port $B_{media}$.

The media portal 44 then returns (at 306) the originating NAPT network address and port ($A_{media}'$, which in the above example is 201.3.3.3:2020) to the application server 42 in a response message (e.g., an MGCP response message). The NAPT network address and port $A_{media}'$ is used to represent user station A to user station B (the called terminal). Similarly, the terminating NAPT network address and port ($B_{media}'$, which in the above example is 201.3.3.3:1010) is used to represent user station B to originating user station A.

The application server 42 then substitutes the network address and port $A_{media}$ (specified in the SDP portion of the original INVITE message) with the originating NAPT network address and port $A_{media}'$. An INVITE message containing $A_{media}'$ is then sent (at 308) to user station B. The content of this INVITE message is shown below:

INVITE

From: A@xxx.com

To: B@xxx.com

SDP: RTP/RTCP 201.3.3.3:2020

The application server 42 responds (at 310) to user station A with a SIP 100 TRYING message, which indicates that an unspecified action has been taken on behalf of the call but the target has not yet been located. Note that the SIP TRYING message is likely communicated from the application server 42 to user station A as soon as the INVITE message (sent at 300) was received by the application server 42. For example, TRYING may have been communicated by the application server 42 before communication of the CreateConnection request at 302.

In response to the INVITE message sent at 308, user station B responds (at 312) with a SIP 180 RINGING message. At this point, user station B knows to send media packets for the call session to network address and port $A_{media}'$. The SIP 180 RINGING message is propagated (at 314) by the application server 42 back to user station A.

If user station B desires to answer the call request (such as when a user takes the target terminal off the hook, an answering machine answers, and so forth), user station B sends a SIP 200 OK message (at 316) to the application server 42. Some of the content of the SIP 200 OK message is as follows:

SIP 200 OK

From: B@xxx.com

To: A@xxx.com

. . .

SDP: RTP/RTCP 54.5.5.5:2000

The SIP 200 OK message contains an SDP portion that specifies the address and port $B_{media}$ of the terminating endpoint. In the example above, the terminating network address and port $B_{media}$ is 54.5.5.5:2000.

In response to the SIP 200 OK message, the application server 42 sends a request (at 318) to the media portal 44 to update the reserved resources (addresses) in the media portal 44 for the current call session. In one example, the request can be in the form of an MGCP ModifyConnection request that has the following content:

MDCX 1236 A:2000@54.5.5.5 MGCP 0.1

C:987651

M: sendrecv

MGCPVerb=MDCX (ModifyConnection)

TransactionId=1236

EndpointId=A:2000@54.5.5.5

MGCPVersion=0.1

CallId=987651

ConnectionMode=sendrecv (send and receive)

The pertinent elements of the ModifyConnection request are the EndpointId parameter, which identifies the terminating network address and port for audio, and the CallId parameter, which is the key to an entry of the mapping table 128.

In an alternative embodiment, an SDP portion may also be included in a SIP RINGING message (or other message), in which case the acts performed at 318 can be performed in response to that message.

Upon receiving the ModifyConnection message, the media portal 44 uses the CallId parameter as a key to find the associated mapping resources in the NAPT mapping table 128. The terminating endpoint field (TermEndpoint) in the table, which was previously unknown, is filled (at 320) with the terminating network address and port $B_{media}$. The mapped resources are now as follows:

| CallId | OrigEndpoint ($A_{media}$) | OrigNAPTAddr ($A_{media}'$) | TermNAPTAddr ($B_{media}'$) | TermEndpoint ($B_{media}$) |
|---|---|---|---|---|
| 987651 | A:1000@47.1.1.1 | A:2020@201.3.3.3 | A:1010@201.3.3.3 | A:2000@54.5.5.5 |

The media portal 44 next returns (at 322) the terminating NAPT network address and port $B_{media}'$ to the application server 42. The application server 42 then substitutes $B_{media}$ with $B_{media}'$ in the SDP portion of the SIP 200 OK message. The modified SIP 200 OK message is then sent (at 324) from the application server 42 to user station A. User station A responds to the SIP 200 OK message with a SIP ACK message (at 326). User station A now knows to send media packets to $B_{media}'$ if user station A wishes to communicate with user station B. The application server 42 propagates the SIP ACK message (at 328) to user station B.

At this point, a media or call session has been established between user stations A and B through the media portal 44. User station A communicates with network address and port $B_{media}'$ (in the public interface of the media portal 44) at 330, and user station B communicates with network address and port $A_{media}'$ (in the public interface of the media portal 44) at 332. Media packets are routed between B' and A' in the media portal 44 by performing translations (at 334) using the mapping table entry shown above.

The media portal 44 is now able to perform NAPT functions using the NAPT table entries shown above during the established call session between user stations A and B. Note that neither user station A nor user station B are aware of the network address and port of the other endpoint. Thus, the user stations A and B send media packets not directly to each other, but to the media portal 44. Media packets that are sent from user station A arrive at network address and port $B_{media}'$ of the media portal, which are forwarded to user station B via $A_{media}'$. Media packets sent from user station B arrive at network address and port $A_{media}'$, which are forwarded to user station A via $B_{media}'$.

Figure 4:
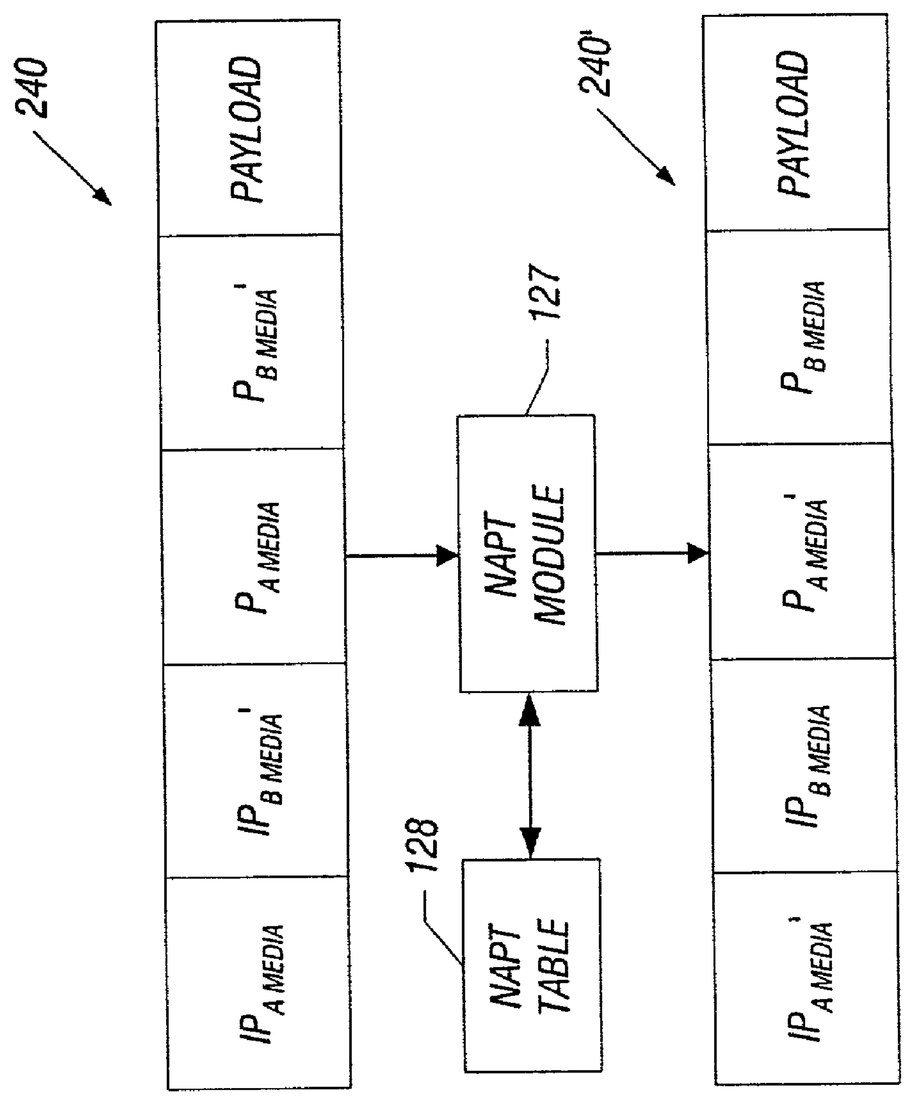
FIG. 4 illustrates mapping of addresses and ports of a media packet communicated in a call session set up by the flow of FIG. 3.

Thus, as shown in FIG. 4, a media packet 240 is originated by user station A. In the media packet, the source IP address is $IP_{Amedia}$, the destination IP address is $IP_{Bmedia'}$, the source UDP port is $P_{Amedia}$, and the destination UDP port is $P_{Bmedia'}$. After conversion of both the source and destination addresses and ports by the mapping module 127 in the media portal 44, the modified media packet 240' contains a source IP address $IP_{Amedia'}$, destination IP address $IP_{Bmedia}$, a source UDP port $P_{Amedia'}$, and a destination UDP port $P_{Bmedia}$. A similar translation process is performed in the reverse direction.

Figure 5:
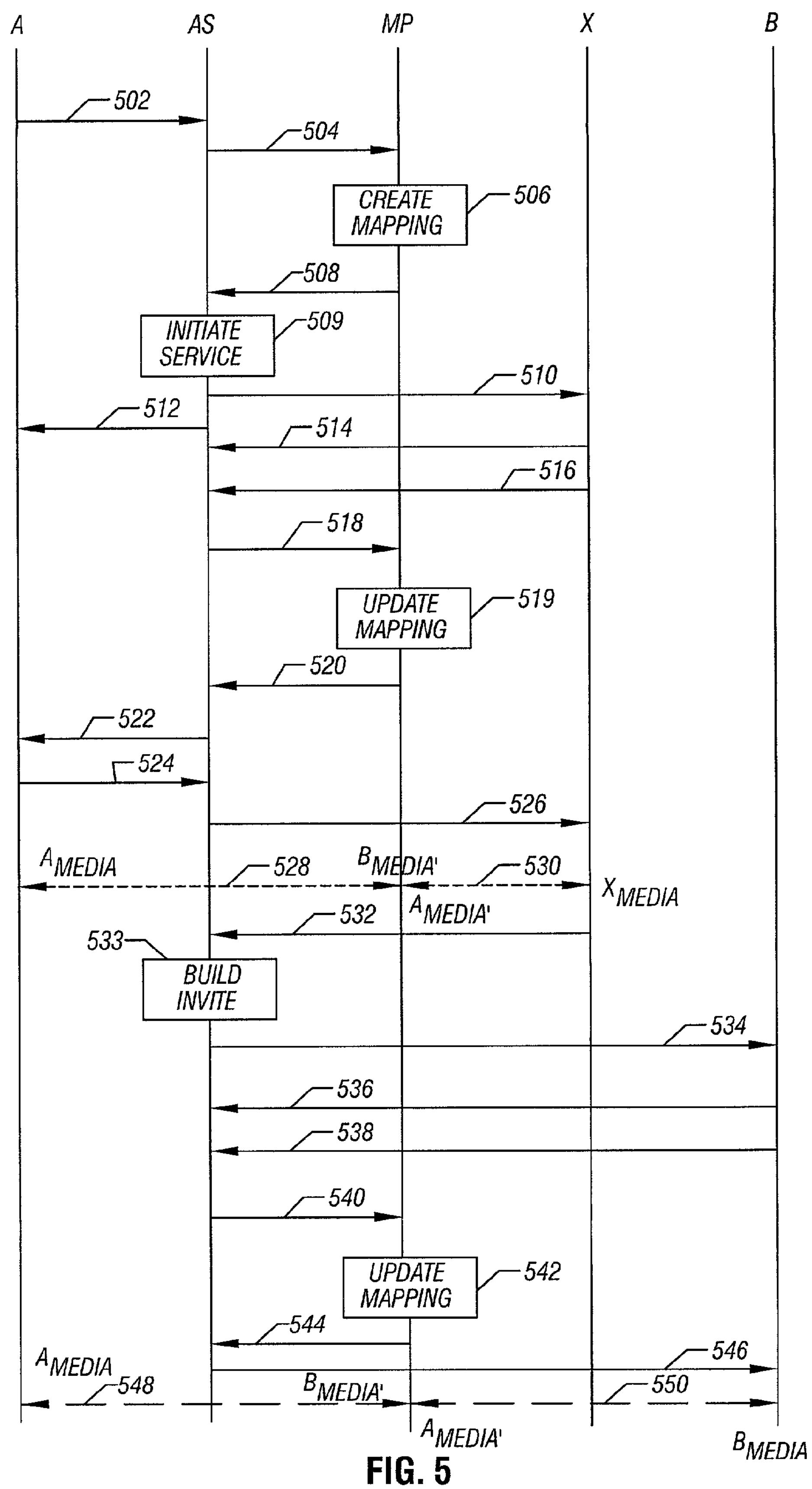
FIG. 5 is a message flow diagram of a call flow illustrating an anchor/pivot feature in accordance with an embodiment.

An example of the anchor/pivot feature is described in connection with FIG. 5, in which user station A initiates a call to another terminal that is behind the gateway 36. The gateway 36 is an internal resource or node of the service provider private network 50. An "internal resource" or "internal node" of the service provider 12 is a node that is connected to the service provider private network 50. In the described example, the destination terminal is a terminal coupled to the PSTN 20, such as the mobile station 30 or wired telephone 34. The gateway 36 provides the endpoint for packet-based communications in calls involving a PSTN-coupled station.

However, before routing the call to the gateway 36, the application server 42 may desire to first connect user station A to the announcement server 49 in the service provider private network 50. This is one example of a service provided by the application server 42 (the service being to provide an announcement to the caller). Other services may also be provided by the application server 42, in which the application server 42 sends messages to other types of nodes before ultimately establishing the call session between user station A and the destination specified in the call request.

User station A (A@xxx.com) calls user station B (B@xxx.com). This is accomplished by sending a SIP INVITE message (at 502) to the application server 42. The SIP INVITE message contains an SDP portion that has the originating network address and port ($A_{media}$) for the return media.

When the application server 42 receives the SIP INVITE message, it performs a location query on the To: address, and determines that user B is accessible through an internal network resource (the gateway 36). The application server 42 also determines that user station A is associated with an external network address.

The application server 42 then sends (at 504) an MGCP CreateConnection request to the media portal 44 to allocate the necessary resources (NAPT addresses and ports) to support the NAPT connections. Since the originating endpoint is outside the network and the terminating endpoint is inside the private network, the application server 42 informs the media portal 44 to allocate different types of NAPT addresses appropriate for the endpoints. This is accomplished by use of a predetermined parameter (referred to as the X+NAPTAddressType parameter), which can have either an INT state or EXT state. The X+NAPTAddressType parameter is added as an enhancement to the MGCP CreateConnection message to identify the different types (internal or external) of endpoints. In this example, the NAPT address and port to allocate in the media portal 44 for communication with user station A is an external address and port, while the NAPT address and port to allocate for communication with the gateway 36 is an internal address and port. The application server 42 uses the X+NAPTAddressType parameter to allocate different types of NAPT resource addresses for the different endpoints.

Figure 3:
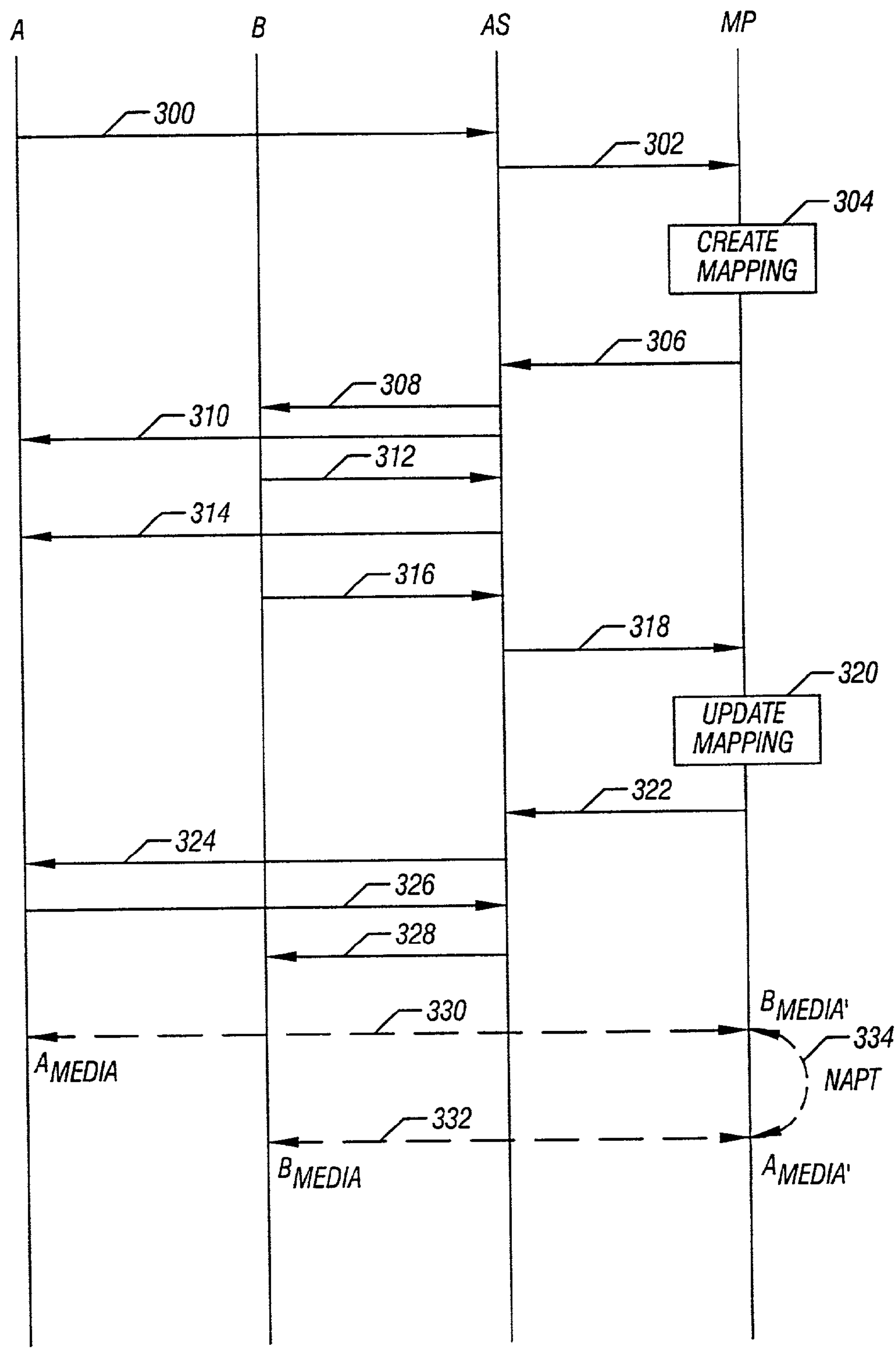
FIG. 3 is a message flow diagram of a call flow between a first user station and a second user station that are part of the same domain.

The MGCP CreateConnection message in one example is as follows:

CRCX 1234 A:1000@47.1.1.1 MGCP 0.1
C: 987651
M: recvonly
X+NAPTAddressType: ON:INT, TN:EXT
MGCPVerb=CRCX (CreateConnection)
TransactionId=1234
EndpointId=A:1000@47.1.1.1
MGCPVersion=0.1
CallId=987651
ConnectionMode=recvonly (receive only)
NAPTAddressType=ON:INT, TN:EXT The parameter X+NAPTAddressType specifies the type of NAPT address for a specific endpoint, either "INT" (Internal) or "EXT" (external). If the X+NAPTAddressType parameter is omitted, the default value of the NAPTAddressType for both the originating endpoint and the terminating endpoint is "EXT." Note that this was the case for the previous call flow (FIG. 3).

In this example, since the originating endpoint is outside the service provider private network 50, the NAPT address and port of the media portal 44 to which user station A sends packets ($B_{media}$' or TN) should be an external address. Since the terminating endpoint is inside the service provider private network 50, the NAPT address and port of the media portal 44 to which the gateway 36 sends packets is A' or ON, which should be an internal address. This is specified by the X+NAPTAddressType parameter in the CreateConnection message above.

In the example, the originating endpoint (A) is outside the private network 12, so the NAPT address and port to which A sends packets ($B_{media}$' or TN) is an external address. The terminating endpoint (B) is inside the private network 12, so the NAPT address and port to which B sends packets ($A_{media}$' or ON) is an internal address.

The media portal 44 reserves the internal address and port ($A_{media}$'), which is mapped to $A_{media}$, and the external network address and port ($B_{media}$'), which is mapped to $B_{media}$. The following mapping table entry, referred to as MTE1, is created (at 506), using the CallId parameter as a key:

| CallId | OrigEndpoint ($A_{media}$) | OrigNAPTAddr ($A_{media}$') | TermNAPTAddr ($B_{media}$') | TermEndpoint ($B_{media}$) |
|---|---|---|---|---|
| 987651 | A:1000@47.1.1.1 | A:2020@192.168.4.4 | A:1010@201.3.3.3 | ??? |

The media portal 44 then returns (at 508) the originating NAPT network address and port ($A_{media}$') to the application server 42. This can be sent back in an MGCP response. The application server 42 then performs a substitution of the network address and port ($A_{media}$ ) specified in the original SIP INVITE message, replacing $A_{media}$ with $A_{media}$'. The application server 42 then initiates (at 509) a service that causes all calls routing through the gateway 36 to first connect to the announcement server 49 or to some other internal resource. The application server 42 then sends (at 510) a SIP INVITE message to the announcement server 49 (which is also referred to as node X).

The application server 42 also responds to the INVITE message from user station A with a SIP 100 TRYING message (at 512). Note that the TRYING message is likely sent before 504.

Node X responds (at 514) to the application server 42 with a SIP 180 RINGING message. When node X answers, it sends (at 516) a SIP 200 OK message to the application server 42. The SIP 200 OK message contains an SDP portion containing the network address and port ($X_{media}$) of node X that is to be used for communication of media packets. In response, the application server 42 sends an MGCP ModifyConnection request (at 518) to the media portal 44 to update the NAPT mapping table entry MTE1. The MGCP command format is as follows:

MDCX 1236 A:1000@192.168.4.5 MGCP 0.1
C: 987651
M: sendrecv
MGCPVerb=MDCX (ModifyConnection)
TransactionId=1236
EndpointId=A:1000@192.168.4.5
MGCPVersion=0.1
CallId=987651
ConnectionMode=sendrecv (send and receive)

The media portal 44 uses the CallId value as a key to find the mapping table entry MTE1 and fills in the previously unknown TermEndpoint value with the network address and port $X_{media}$. The updated mapping table entry is as follows:

| CallId | OrigEndpoint ($A_{media}$) | OrigNAPTAddr ($A_{media}$') | TermNAPTAddr ($B_{media}$') | TermEndpoint ($X_{media}$) |
|---|---|---|---|---|
| 987651 | A:1000@47.1.1.1 | A:2020@192.168.4.4 | A:1010@201.3.3.3 | A:1000@192.168.4.5 |

The media portal 44 then returns (at 520) the terminating NAPT network address and port $B_{media}$' to the application server 42 in an MGCP response. The application server 42 performs a substitution of the network address and port in the original SIP 200 OK message, replacing $X_{media}$ with $B_{media}$'. The application server then forwards (at 522) the modified SIP 200 OK message to user station A.

User station A responds to the SIP 200 OK message with a SIP ACK (at 524). The application server 42 then propagates (at 526) the SIP ACK message to node X. At this point, a media session is established, with a media connection (528) between $A_{media}$ and $B_{media}$' and a media connection (530) between $A_{media}$' and $X_{media}$. Media connections 528 and 530 are collectively referred to as a media or call session. Through these connections, the announcement server 49 is able to send announcement messages to user station A in IP packets containing RTP media.

When the announcement server 49 completes its announcement, it sends an audio complete message (at 532) to the application server 42. The audio complete message can be in any format, proprietary or otherwise. In response, the application server 42 builds (at 533) a SIP INVITE message on behalf of user station A (to honor the original request) and ensures that the network address and port $A_{media}$' is included in the SDP portion of the INVITE message. The application server 42 forwards (at 534) the SIP INVITE message to node B (which is the gateway 36 in this example).

Node B responds to the application server 42 (at 536) with a SIP 180 RINGING message. When the remote terminal (e.g., mobile station, wired telephone, etc.) answers, and an indication is received at the gateway 36, the gateway 36 sends (at 538) a SIP 200 OK message to user station A via the application server 42. In one example, the content of the SIP 200 OK message is as follows:

SIP 200 OK
From: B@xxx.com
To: A@xxx.com
. . .
SDP: RTP/RTCP 192.168.5.5:2000

The SDP portion of the SIP 200 OK message contains the address and port ($B_{media}$) of the gateway 36.

The application server 42 responds to the SIP 200 OK message by sending a ModifyConnection request (at 540) to the media portal 44 to update the mapping table entry MTE2. The MGCP command is as follows in accordance with one example:

MDCX 1236 A:2000@192.168.5.5 MGCP 0.1
C: 987651
M: sendrecv
MGCPVerb=MDCX (ModifyConnection)
TransactionId=1236
EndpointId=A:2000@192.168.5.5
MGCPVersion=0.1
CallId=987651
ConnectionMode=sendrecv (send and receive)

Using the CallId parameter as a key, the media portal 44 updates (at 542) the mapping resources in the mapping table entry, substituting TermEndpoint (X) with TermEndpoint (B). Thus, the updated mapping table entry MTE2 contains the following addresses and ports $A_{media}$, $A_{media}'$, $B_{media}'$ and $B_{media}$, as compared to network addresses and ports $A_{media}$, $A_{media}'$, $B_{media}'$ and $X_{media}$ in mapping table entry MTE1.

The mapping table entry (MTE2) is as follows:

| CallId | OrigEndpoint ($A_{media}$) | OrigNAPTAddr ($A_{media}'$) | TermNAPTAddr ($B_{media}'$) | TermEndpoint ($B_{media}$) |
|---|---|---|---|---|
| 987651 | A:1000@47.1.1.1 | A:2020@192.168.4.4 | A:1010@201.3.3.3 | 2000@192.168.5.5 |

The media portal 44 then returns (at 544) the terminating NAPT network address and port $A_{media}'$ to the application server 42 in an MGCP response. The application server 42 then propagates (at 546) a SIP ACK message to node B (the gateway 36). At this point, in the call session, the media connection 548 is maintained between $A_{media}$ and $B_{media}'$, while a new media connection is established between $A_{media}'$ and $B_{media}$ (at 550). Thus, $A_{media}$ is the anchored endpoint address and port, while $X_{media}$ is transparently pivoted to $B_{media}$ during the call session shown in FIG. 5.

Figure 6:
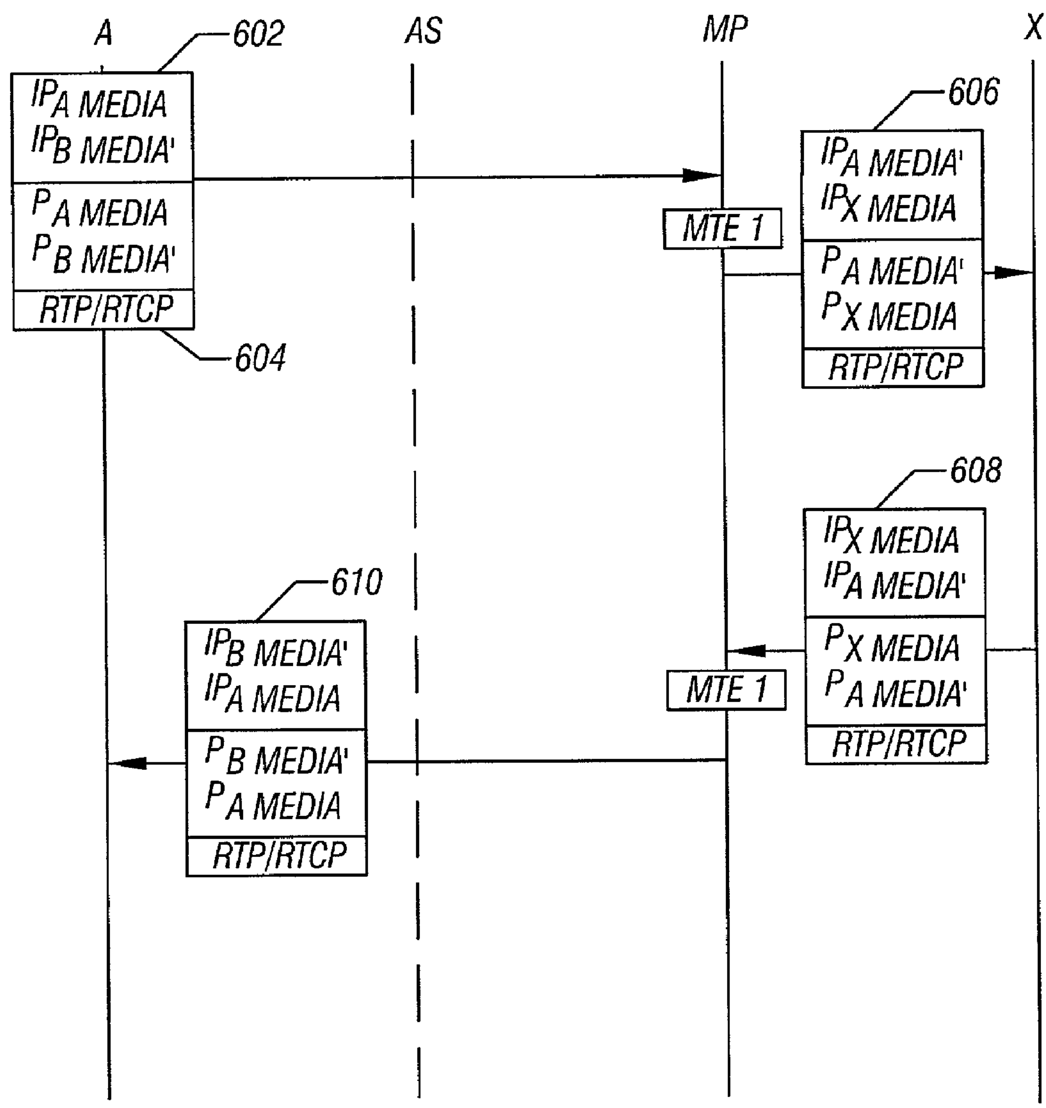
FIG. 6 is a message flow diagram illustrating the exchange of media packets between a first terminal and a first node before an endpoint is pivoted in a call session established by the call flow of FIG. 5.

FIG. 6 shows exchanges of media packets between user station A and node X (the announcement server 49). A media packet 602 is sent from $A_{media}$ to $B_{media}'$. $A_{media}$ includes an IP address $IP_{Amedia}$ and a UDP port $P_{Amedia}$, and $B_{media}'$ includes an IP address $IP_{Bmedia'}$, and a UDP port $P_{Bmedia'}$. The IP header of the packet 602 contains the source address $IP_{Amedia}$ and destination address $IP_{Bmedia'}$. The UDP header of the packet 602 contains a source port $P_{Amedia}$ and a destination port $P_{Bmedia'}$. In addition, the IP packet contains a payload section 604.

When the packet 602 is received by the media portal 44, the packet 602 is processed using the mapping table entry MTE1. The translation causes the source address to be changed from $IP_{Amedia}$ to $IP_{Amedia'}$, and the source port to be changed from $P_{Amedia}$ to $P_{Amedia}'$. Also, the destination IP address is changed from $IP_{Bmedia'}$ to $IP_{Xmedia}$, and the destination port is changed from $P_{Bmedia'}$ to $P_{Xmedia}$. The modified packet 606 is sent to node X.

In the return path, a media packet 608 contains a source IP address $IP_{Xmedia}$ (which is the IP address of node X) and a destination IP address $IP_{Amedia'}$, (which is the IP address of interface $A_{media}'$ of the media portal 44). The source UDP port is $P_{Xmedia}$ and the destination UDP port is $P_{Amedia'}$. When the media packet 608 is received by the media portal 44, the media packet 608 is translated according to the mapping table entry MTE1, in which the source IP address $IP_{Xmedia}$ is changed to $IP_{Bmedia'}$, and the destination IP address is changed from $IP_{Amedia'}$ to $IP_{Amedia}$. Similarly, the source port is changed from $P_{Xmedia}$ to $P_{Bmedia'}$, and the destination port is changed from $P_{Amedia}'$ to $P_{Amedia}$. A modified packet 610 is sent from the media portal 44 to user station A.

Figure 7:
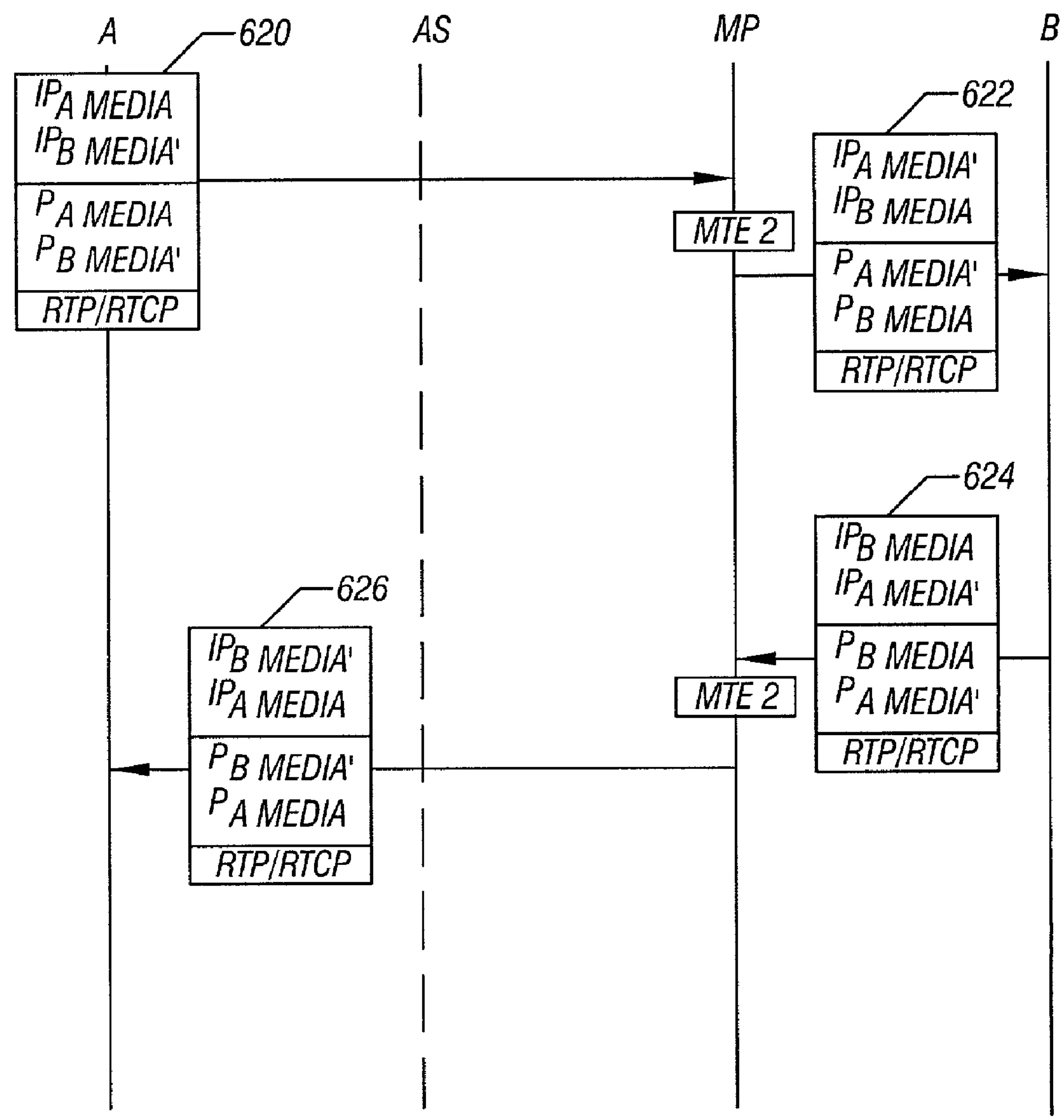
FIG. 7 is a message flow diagram illustrating the exchange of media packets between the first terminal and another node after the endpoint has been pivoted in the call session of FIG. 6.

After the destination has been pivoted from node X to B in the call session, and the mapping table entry has been changed from MTE1 to MTE2, the routing of media packets is changed, as illustrated in FIG. 7. A media packet 620 sent by user station A contains source and destination IP addresses and ports that are the same as those of media packet 602 shown in FIG. 6. However, once the media portal 44 receives the packet 620, mapping table entry MTE2 is used to translate the source and destination addresses and ports. After the translation, a media packet 622 is created, in which both the source and destination addresses and ports have been changed. In this case, the source IP address is changed from $IP_{Amedia}$ to $IP_{Amedia'}$, and the destination IP address is changed from $IP_{Bmedia'}$ to $IP_{Bmedia}$. Similarly, the source port is changed from $P_{Amedia}$ to $P_{Amedia'}$, and the destination port is changed from $P_{Bmedia'}$ to $P_{Bmedia}$. The modified media packet 622 is then sent to node B (e.g., the gateway 36).

In the packet 624 sent in the return path, the source IP address and port are $IP_{Bmedia}$ and $P_{Bmedia}$, respectively. The destination network address and port are $IP_{Amedia'}$ and $P_{Amedia'}$, respectively. Upon receiving the packet 624, the media portal 44 uses mapping table entry MTE2 to translate the source network address and port to $IP_{Bmedia'}$ and $P_{Bmedia'}$, respectively. The media portal 44 also changes the destination network address and port to $IP_{Amedia}$ and $P_{Amedia}$, respectively (resulting in packet 626).

Although several examples are provided above, other call flows involving other terminals or nodes are possible in other embodiments. The anchor/pivot feature remains the same for each of these other call flows, with the application server 42 and/or media portal 44 able to maintain one endpoint anchored while one or more other endpoints are pivoted. This can be accomplished transparently to the anchored endpoint, so call setup signaling with the anchored endpoint can be avoided to reduce the amount of traffic on a network and to enhance the speed with which a call session can be switched from one endpoint to another. This also enables support for less capable endpoints that do not support mid-call negotiation.

The various nodes and systems discussed each includes various software routines or modules. Such software routines or modules are executable on corresponding control units. Each control unit includes a microprocessor, a microcontroller, a processor card (including one or more microprocessors or microcontrollers), or other control or computing devices. As used here, a "controller" refers to a hardware component, software component, or a combination of the two. Although used in the singular sense, a "controller" can also refer to plural hardware components, plural software components, or a combination thereof.

The storage devices referred to in this discussion include one or more machine-readable storage media for storing data and instructions. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Instructions that make up the various software routines or modules in the various devices or systems are stored in respective storage devices. The instructions when executed by a respective control unit cause the corresponding node or system to perform programmed acts.

The instructions of the software routines or modules are loaded or transported to each node or system in one of many different ways. For example, code segments including instructions stored on floppy disks, CD or DVD media, a hard disk, or transported through a network interface card, modem, or other interface device are loaded into the device or system and executed as corresponding software routines or modules. In the loading or transport process, data signals that are embodied in carrier waves (transmitted over telephone lines, network lines, wireless links, cables, and the like) communicate the code segments, including instructions, to the device or system. Such carrier waves are in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A system comprising:

one or more interfaces to one or more corresponding networks coupled to plural endpoints; and a controller adapted to receive a call request and to establish a call session between a first endpoint and a second endpoint in which media is exchanged between the first and second endpoints, the controller adapted to further pivot the second endpoint to one other endpoint in the call session without exchanging call setup signaling with the first endpoint to enable media to be exchanged between the first endpoint and the other endpoint, wherein pivoting the second endpoint to the other endpoint causes media to be exchanged between the first endpoint and the other endpoint without passing through the second endpoint.

2. The system of claim 1, wherein the controller is adapted to further pivot the first endpoint to another endpoint in the call session without exchanging call setup signaling with the second endpoint.

3. The system of claim 1, wherein the controller is adapted to process Session Initiation Protocol messages, the call request comprising an INVITE message.

4. The system of claim 1, wherein the controller pivots the second endpoint to the one other endpoint by sending a second call request to the other endpoint.

5. The system of claim 4, wherein the controller comprises a control portion to process call control signaling, the call control signaling comprising the call request, the controller further comprising a media engine to control communication of media packets between the first and second endpoints and between the first and the other endpoints.

6. The system of claim 5, wherein the media engine comprises network address translation information for media communication between the first endpoint and the second endpoint.

7. A system comprising:

one or more interfaces to one or more corresponding networks coupled to plural endpoints; and a controller adapted to receive a call request and to establish a call session between a first endpoint and a second endpoint in which media is exchanged between the first and second endpoints, the controller adapted to further pivot the second endpoint to one other endpoint in the call session without exchanging call setup signaling with the first endpoint to enable media to be exchanged between the first endpoint and the other endpoint, wherein the controller pivots the second endpoint to the one other endpoint by sending a second call request to the other endpoint, wherein the controller comprises a control portion to process call control signaling, the call control signaling comprising the call requests, the controller further comprising a media engine to control communication of media packets between the first and second endpoints and between the first and the other endpoints, wherein the media engine comprises network address translation information for media communication between the first endpoint and the second endpoint, wherein the media engine is adapted to dynamically modify the address translation information during the call session to enable pivoting of the second endpoint to the other endpoint.

8. The system of claim 7, wherein the controller is adapted to further pivot the first endpoint to another endpoint in the call session without exchanging call setup signaling with the second endpoint, and wherein the media engine is adapted to further dynamically modify the address translation information during the call session to enable pivoting of the first endpoint.

9. The system of claim 7, wherein the media engine comprises a storage device to store the address translation information.

10. The system of claim 7, wherein the media engine is adapted to convert both the source and destination address of a media packet containing media using the address translation information.

11. The system of claim 10, wherein the media engine is adapted to act as a portal through which media packets between the first and second endpoints flow.

12. The system of claim 11, wherein the media engine is adapted to shield an address of the first endpoint from the second endpoint and to shield an address of the second endpoint from the first endpoint.

13. An article comprising at least one storage medium containing instructions for providing a call session, the instructions when executed causing a system to:

receive a call request;

establish a call session between the first endpoint and a second endpoint in which media is exchanged between the first endpoint and the second endpoint;

change the second endpoint to a third endpoint in the call session to enable communication of media between the first endpoint and third endpoint, wherein changing the second endpoint to the third endpoint is accomplished without exchanging call setup signaling with the first endpoint;

send one or more requests to a media engine to establish network address translation information for media communicated through the media engine between the first and second endpoints; and send one or more requests to the media engine to update the address translation information to dynamically change the second endpoint to the third endpoint in the call session.

14. The article of claim 13, wherein the instructions when executed cause the system to further change the first endpoint to another endpoint in the call session without exchanging call setup signaling with the second endpoint.

15. The article of claim 13, wherein the instructions when executed cause the system to further send a call request to the third endpoint to change endpoints in the call session but not sending a call request to the first endpoint.

16. The article of claim 13, wherein the instructions when executed cause the system to further receive a completion indication from the second endpoint, and in response to the completion indication, to send the call request to the third endpoint.

17. The article of claim 13, wherein the instructions when executed cause the system to further send one or more requests to a media engine to establish network address translation information for media communicated through the media engine between the first and second endpoints.

18. The article of claim 13, wherein the instructions when executed cause the system to further send another request to the media engine to update the translation information to dynamically change the first endpoint to another endpoint.

19. The article of claim 13, wherein the instructions when executed cause the system to receive the call request by receiving a Session Initiation Protocol INVITE message.

20. A method of providing a call session, comprising:

establishing a call session between a first endpoint and a second endpoint to enable communication of media between the first and second endpoints through a portal; and pivoting the second endpoint to a third endpoint in the call session without exchanging call setup signaling with the first endpoint to enable communication of media between the first and third endpoints through the portal, wherein pivoting the second endpoint to the third endpoint comprises updating address translation information in the portal to enable the pivoting.

21. The method of claim 20, further comprising sending a call request to the third endpoint, but not sending a call request to the first endpoint, to pivot the second endpoint to the third endpoint in the call session.

22. The method of claim 20, further comprising the portal performing network address translation, using the address translation information, of addresses contained in media packets communicated through the portal.

23. The method of claim 22, wherein performing the address translation comprises performing address translation of both the source and destination address of each media packet.

24. The method of claim 23, further comprising the portal shielding an address of the first endpoint from either of the second or third endpoint and shielding an address of either the second or third endpoint from the first endpoint.

25. The method of claim 20, wherein establishing the call session comprises establishing a Session Initiation Protocol session.

26. The method of claim 20, further comprising creating the address translation information in the portal while establishing the call session between the first and second endpoints.

27. The method of claim 20, wherein media is communicated between the first endpoint and third endpoint without passing through the second endpoint.

* * * * *